(12) United States Patent
Nakao et al.

(10) Patent No.: US 6,230,747 B1
(45) Date of Patent: May 15, 2001

(54) PIPE CONNECTING METHOD AND PIPING STRUCTURE

(75) Inventors: Noriaki Nakao; Haruhiko Nishino, both of Osaka (JP)

(73) Assignees: Daikin Industries, Ltd.; O.K. Kazai Co., Ltd., both of Osaka (JP)

( * ) Notice: Subject to any disclaimer, the term of this patent is extended or adjusted under 35 U.S.C. 154(b) by 0 days.

(21) Appl. No.: 09/038,785

(22) Filed: Mar. 9, 1998

Related U.S. Application Data

(63) Continuation-in-part of application No. 08/646,270, filed on May 21, 1996, now abandoned.

(30) Foreign Application Priority Data

Sep. 22, 1994 (JP) .................................................. 6-227810

(51) Int. Cl.⁷ .................................................. F16L 11/00
(52) U.S. Cl. ................. 138/109; 285/288.11; 285/289.5
(58) Field of Search .............................. 138/89, 89.3, 90, 138/96 R, 109; 285/3, 21.1, 288.11, 289.5, 294.1, 397

(56) References Cited

U.S. PATENT DOCUMENTS

| | | |
|---|---|---|
| 2,933,333 | 4/1960 | Bredtschneider et al. ............... 285/3 |
| 3,202,442 | 8/1965 | Abbey et al. .............................. 285/3 |
| 3,508,766 | 4/1970 | Kessler et al. ....................... 285/21.1 |
| 4,022,205 | 5/1977 | Tenczar ................................. 285/3 X |
| 4,219,221 | 8/1980 | Webb ....................................... 285/3 |
| 4,844,322 * | 7/1989 | Flowers et al. ....................... 228/119 |
| 5,098,010 * | 3/1992 | Carmichael et al. ................. 228/223 |
| 5,176,410 | 1/1993 | Beyer ..................................... 285/187 |

FOREIGN PATENT DOCUMENTS

| | | |
|---|---|---|
| 1475799 | 3/1969 | (DE) . |
| 1929522 | 12/1970 | (DE) ..................................... 285/3 |
| 2427381 | 7/1975 | (DE) ..................................... 285/3 |
| 4314275 | 11/1994 | (DE) . |
| 0458054 | 11/1991 | (EP) . |
| 1238443 | 12/1960 | (FR) . |
| 801162 | 9/1958 | (GB) ..................................... 285/3 |
| 982004 | 2/1965 | (GB) ..................................... 285/3 |
| 1132443 | 10/1968 | (GB) ..................................... 285/3 |
| 55-6747 | 1/1980 | (JP) . |
| 31025 | 7/1991 | (JP) . |
| 4208370 | 7/1992 | (JP) . |

* cited by examiner

*Primary Examiner*—William Stryjewski
(74) *Attorney, Agent, or Firm*—Nixon Peabody, LLP; Donald R. Studebaker

(57) ABSTRACT

A pipe (40) having a specific length is filled with nitrogen gas (4a). From opening ends of connecting portions (42, 42) located at respective ends of the pipe (40), cross sectionally hat-shaped block plugs (50) made of brazing material are pressed into the connecting portions (42, 42) respectively and are fitted thereto for the purpose of sealing the pipe (40). Next, one end of a connecting piece (60) is inserted into the connecting portion (42) of one pipe (40) so as to break through the block plug (50) fitted thereto. The other end of the connecting piece (60) is also inserted into the connecting portion (42) of another pipe (40) so as to break through the block plug (50) fitted thereto. Thereafter, the block plugs (50) are melt so that the connecting portions (42) of both the pipes (40) are brazed with the connecting piece (60).

13 Claims, 11 Drawing Sheets

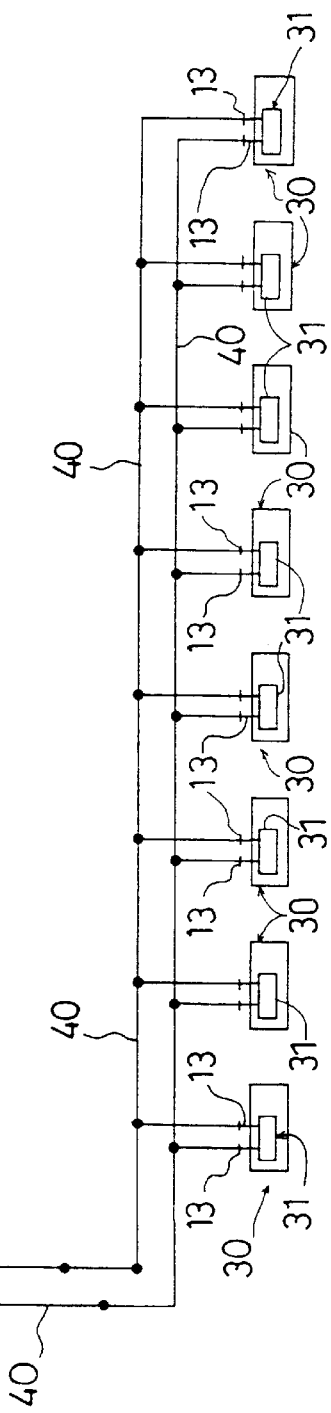
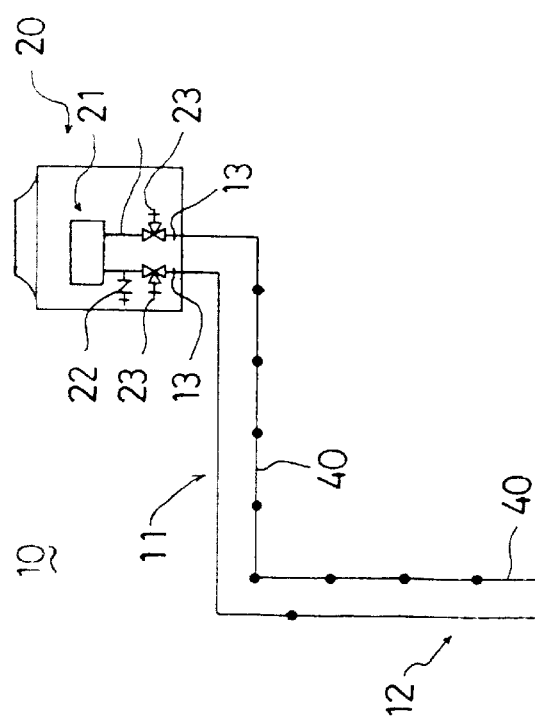
Fig.1

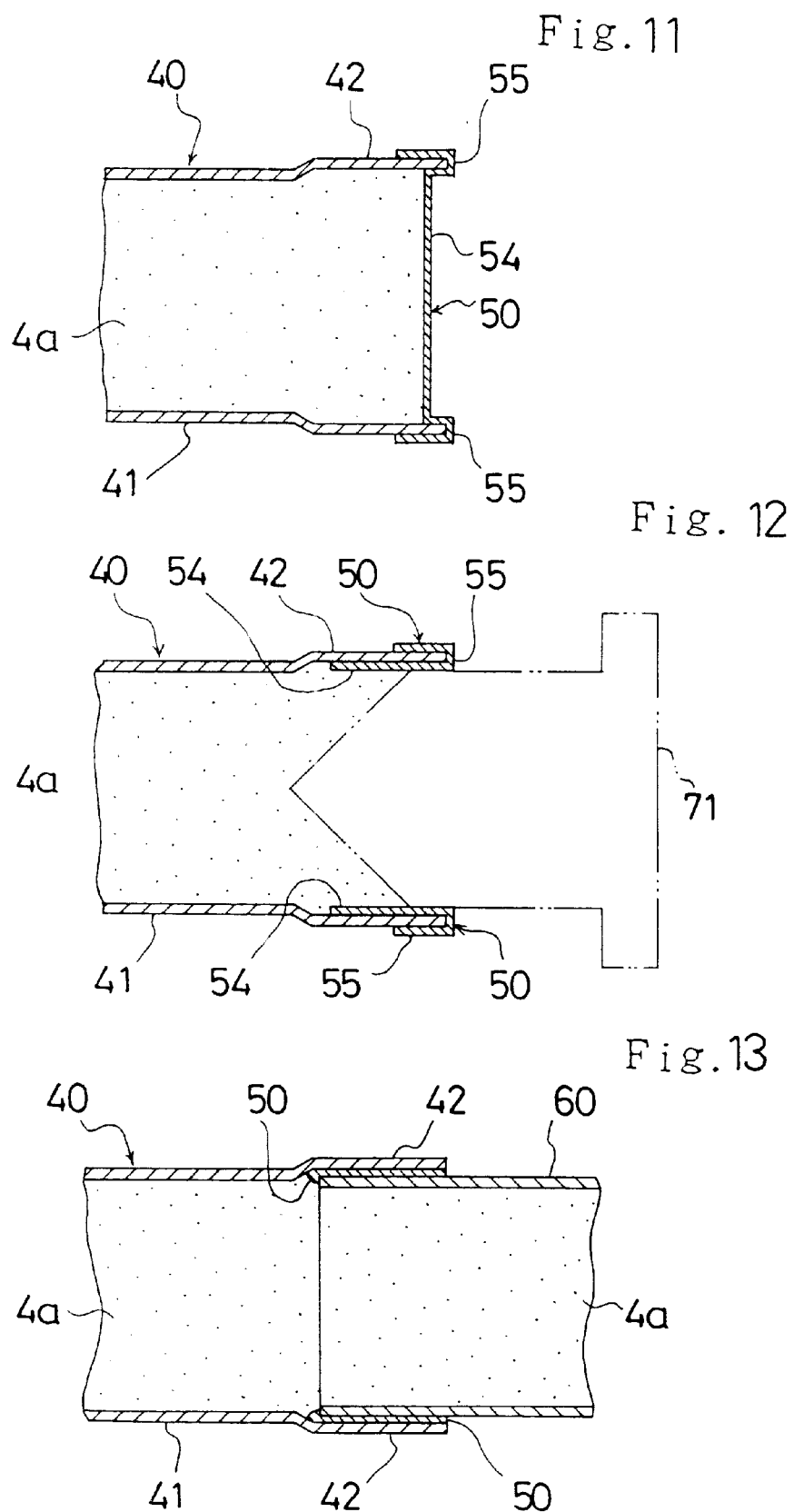

PIPE CONNECTING METHOD AND PIPING STRUCTURE

This application is a continuation-in-part of prior application Ser. No. 08/646,270 filed May 21, 1996 (now abandoned).

BACKGROUND OF THE INVENTION

This invention relates to a piping structure and in particular relates to the structure of a joint portion between pipes.

As one of conventional refrigerating apparatus, there has been known a multi-type air conditioner as disclosed in Japanese Patent Application Laid-Open Gazette No. 4-208370, in which a plurality of indoor units are connected to a single outdoor unit. In this air conditioner, a refrigerant circuit of the outdoor unit is connected to a refrigerant circuit of each of the indoor units through a connection pipe thereby forming a refrigerant piping system.

For the above-mentioned air conditioner, the outdoor unit and the indoor units are shipped from production facilities, are carried to the site of installation in a building or the like, are installed and are then connected to the connection pipe.

The connection pipe is formed in a way of brazing both pipes which each have a specific length and are each made of a copper pipe with each other. At the time, nitrogen is poured into the connection pipe to remove air out of the connection pipe so that air in the connection pipe is wholly displaced by nitrogen, and thereafter both the pipes are brazed.

Problems to be Solved

Each pipe of the air conditioner is formed, for example, in a uniform diameter from one opening end to another opening end and as mentioned above, the connection pipe is formed by brazing the pipes.

Meanwhile, in pipe connecting work, some general rules must be strictly observed. The general rules include "clean rule" and "dry rule". The dry rule is a rule that makes pipe connecting work so as not to leave water in the pipe. The clean rule is a rule that makes pipe connecting work so as to prevent the entry of alien substances into the pipe.

However, in conventional pipe connecting work, sufficient parts management is not necessarily made. For example, water drops due to dew fall or the like are often left on the inner surface of an original pipe for pipe connecting work. In other words, the pipe is often stored with both opening ends open.

Therefore, the pipe causing dew fall may be used as it is. Further, air in the pipe includes moisture. Accordingly, water may be left in the pipe contrary to the dry rule when refrigerant is charged into the pipe. This causes a problem of lack of reliability of air conditioning.

Furthermore, when the pipe is heated by a burner or the like in brazing, air in the pipe may produce an oxide film on the surface of the pipe made of a copper pipe.

Such a phenomenon is contrary to the clean rule. In detail, when refrigerant is charged into the pipe, the refrigerant peels off the oxide film. The peeled oxide film may blockade a narrow space such as a capillary tube or may pollute a lubricating oil for refrigerating apparatus thereby degrading lubricating performance. This may cause a problem leading to breakage of equipment.

The present invention has been made in view of the foregoing problems and therefore has an object of enabling strict observation of both the clean rule and the dry rule in pipe connecting work thereby enhancing the reliability of air conditioning.

SUMMARY OF THE INVENTION

To attain the above object, a measure taken in the present invention is to blockade both opening ends of a pipe with metallic films respectively.

Specific Features of the Invention

More specifically, a pipe connecting method as a first aspect of the invention first comprises a blockading step of fitting a block plug (50) made of a film of brazing material to an opening end of a connecting portion (42) continuously located on at least one end side of a main portion (41) of a pipe (40) formed in a specific length in a way that the outer periphery of the block plug (50) adheres closely to the opening end of the connecting portion (42) thereby defining the inside and outside of the pipe (40).

The above method further comprises a piece inserting step of inserting one end of a connecting piece (60) into the connecting portion (42) of the pipe (40) in a way of breaking through the block plug (50) and inserting the other end of the connecting pipe (60) into the connecting portion (42) of another pipe (40) in a way of breaking through another block plug (50), thereby leaving each of the block plugs (50) between the connecting portion (42) of each of the pipes (40) and the connecting piece (60).

The above method still further comprises a joint step of externally heating the connecting portions (42) of the pipes (40) into which the connecting piece (60) is inserted to melt the block plugs (50) thereby jointing the connecting portions (42) of the pipes (40) with the connecting piece (60) through the block plugs (50).

A pipe connecting method as a second aspect of the invention comprises a blockading step of fitting a block plug (50) made of a film of brazing material to a connecting portion (42) continuously located on at least one end side of a main portion (41) of a pipe (40) formed in a specific length in a way that the outer periphery of the block plug (50) adheres closely to the connecting portion (42) thereby defining the inside and outside of the pipe (40).

The above method further comprises an inserting step of inserting the connecting portion (42) of another pipe (40) into the connecting portion (42) of the former pipe (40) to contact the block plug (50) fitted to the former pipe (40) with an end of the latter pipe (40).

The above method still further comprises a joint step of externally heating the connecting portion (42) of the former pipe (40) to melt the block plug (50) thereby jointing both the connecting portions (42) of the pipes (40) through the block plug (50).

A pipe connecting method as a third aspect of the invention comprises a blockading step of forming an end piece (43) including joint portions (44, 44) located at respective ends and a bagged portion (45) larger in diameter than the joint portions (44, 44), fitting a block plug (50) formed of a metallic film to the bagged portion (45) of the end piece (43) in a way that the outer periphery of the block plug (50) adheres closely to the inner periphery of the bagged portion (45), and fitting one of the joint portions (44) of the end piece (43) to an end of the main portion (41) of the pipe (40) thereby forming connecting portions (42) at both ends of the pipe (40) respectively.

The above method further comprises a piece inserting step of inserting a connecting piece (60) into the end piece (43) in a way of breaking more than a half of the outer peripheral edge of the block plug (50) thereby leaving the block plug (50) between the bagged portion (45) and the connecting piece (60).

The above method still further comprises a joint step of brazing the connecting piece (60) and the joint portion (44) of the end piece (43) with each other.

In the above pipe connecting methods, the connecting portions (42) of the pipe (40) may be formed at both ends of the main portion (41) of the pipe (40) in a way to be continuous with the ends of the main portion (41), respectively. Both the connecting portions (42) may each have the block plug (50) so that the inside of the pipe (40) is enclosed.

In the pipe connecting method of the invention, the connecting portions (42) of the pipe (40) may be formed at both ends of the main portion (41) of the pipe (40) in a way to be continuous with the ends of the main portion (41), respectively, one of the connecting portions (42) may be formed into a large-diameter connecting portion larger in diameter than the main portion (41), the other connecting portion (42) may be formed into a small-diameter connecting portion identical in diameter with the main portion (41), and the small-diameter connecting portion (42) of the pipe (40) may be inserted into the large-diameter connecting portion (42) of another pipe (40) and both the connecting portions (42, 42) may be then jointed.

In the pipe connecting method of the invention, the block plug (50) may be shaped into a hat in cross section. The block plug (50) may be press-fitted into the connecting portion (42) or may be ultrasonically bonded with the connecting portion (42).

In the pipe connecting method of the invention, the connecting portion (42) of the pipe (40) may be formed in a diameter larger than that of the main portion (41).

In the pipe connecting method of the invention, the pipe (40) may be filled with inert gas (4a) with the inside thereof enclosed by the block plugs (50).

In the pipe connecting method of the invention, the pipe (40) may be a copper pipe.

In the pipe connecting method of the invention, both ends (61) of the connecting piece (60) may be each shaped into a wedge point.

In the pipe connecting method of the invention, a ring of brazing material (62) may be fitted on the connecting piece (60).

In the pipe connecting method of the invention, the pipe (40) may be a refrigerant pipe for refrigerating apparatus (10).

In a piping structure as a fourth aspect of the invention, a pipe (40) is formed in a specific length. In addition, to an opening end of a connecting portion (42) continuously located on at least one end side of a main portion (41) of the pipe (40), a block plug (50) made of a film of brazing material for jointing the pipe (40) with another pipe (40) by melting through the application of heat is fitted in a way that the outer periphery of the block plug (50) adheres closely to the opening end of the connecting portion (42) thereby defining the inside and outside of the pipe (40).

In a piping structure as a fifth aspect of the invention, a main portion (41) of a pipe (40) is formed in a specific length. Further, an end piece (43) including joint portions (44, 44) located at respective ends and a bagged portion (45) larger in diameter than the joint portions (44, 44) is fitted at one of the joint portions (44) to an end of the main portion (41) of the pipe (40) thereby forming a connecting portion (42) at an end of the pipe (40).

In addition, at the bagged portion (45) of the end piece (43), a block plug (50) formed of a metallic film different in material from jointing material is provided and is broken by the insertion of the connecting piece (60) therein to in a way to be left between the bagged portion (45) and the connecting piece (60) thereby defining the inside and outside of the pipe (40).

The piping structure of the invention may be organized in a way that one end of the connecting piece (60) is inserted into the connecting portion (42) of one pipe (40) in a way of breaking through the block plug (50), the other end of the connecting piece (60) is inserted into the connecting portion (42) of another pipe (40) in a way of breaking through another block plug (50), and the connecting portion (42) of each of the pipes (40) is externally heated so that the block plug (50) is melt thereby jointing the connecting portion (42) with the connecting piece (60) through the block plug (50).

The piping structure of the invention may be organized in a way that the connecting portion (42) of one pipe (40) is inserted into the connecting portion (42) of another pipe (40) to a position that an end of the former pipe (40) comes into contact with the block plug (50) fitted to the latter pipe (40), and the connecting portion (42) of the pipe (40) located outside is externally heated so that the block plug (50) is melt thereby jointing both the connecting portions (42) of the pipes (40) through the block plug (50).

In the piping structure of the invention, the connecting portions (42) of the pipe (40) may be formed at both ends of the main portion (41) of the pipe (40) in a way to be continuous with the ends of the main portion (41), respectively. Both the connecting portions (42) may each have the block plug (50) so that the inside of the pipe (40) is enclosed.

In the piping structure of the invention, both ends (61) of the connecting piece (60) may be each shaped into a wedge point.

The piping structure of the invention may be organized in a way that the connecting portions (42) of the pipe (40) are formed at both ends of the main portion (41) of the pipe (40) in a way to be continuous with the ends of the main portion (41), respectively, one of the connecting portions (42) is formed into a large-diameter connecting portion larger in diameter than the main portion (41), the other connecting portion (42) is formed into a small-diameter connecting portion identical in diameter with the main portion (41), and the small-diameter connecting portion (42) of the pipe (40) is inserted into the large-diameter connecting portion (42) of another pipe (40) and both the connecting portions (42, 42) are then jointed.

In the piping structure of the invention, the pipe (40) may be filled with inert gas (4a) with the inside thereof enclosed by the block plug (50).

In the pipe connecting method of the invention, the pipe (40) may be a refrigerant pipe for refrigerating apparatus (10).

Operation

Under the above structure of the invention, the pipe connecting method starts with the blockading step of blockading the pipe (40). For example, a uniform-diameter original pipe, from which water and oil are removed, is formed and the connecting portions (42, 42) continuous with the main portion (41) are then formed.

Particularly, the pipe (40) is a refrigerant pipe for refrigerating apparatus and is a copper pipe. The connecting portions (42, 42) are formed in a diameter larger than that of the main portion (41).

Thereafter, inert gas (4a) is charged into the pipe (40).

Subsequently, in the state that the pipe (40) is filled with inert gas (4a), the block plugs (50) made in another step are respectively inserted into both the connecting portions (42, 42) from the opening ends thereof, and the block plugs (50) are fitted to the pipe (40) so as to seal the pipe (40), thereby completing the blockading step.

Particularly, the block plugs (50) are made of brazing material. Further, the block plugs (50) are each shaped into a hat in cross section. Accordingly, the trunk portions of the block plugs are press-fitted into the connecting portions (42, 42) from the opening ends thereof respectively or the block plugs (50) are ultrasonically bonded with the connecting portions (42, 42) respectively.

Thereafter, for example, at the site of installation of the refrigerating apparatus (10), the piece inserting step is started. In detail, for the connection of two pipes (40, 40), one end of the connecting piece (60) is inserted into the connecting portion (42) of one of the pipes (40) and the other end of the connecting piece (60) is inserted into the connecting portion (42) of the other pipe (40).

Subsequently, the two pipes (40, 40) are moved toward each other and the connecting piece (60) is pushed into the connecting portions (42, 42) of both the pipes (40, 40). At the time, since the end (61) of the connecting piece (60) is shaped into a point, the push of the connecting piece (60) provides breakage of the block plug (50) by the connecting piece (60).

In this state, the block plug (50) is interposed between the connecting piece (60) and the connecting portion (42) of the pipe (40).

Subsequently, the pipe connecting method proceeds from the piece inserting step to the joint step. In the state that the connecting piece (60) is pushed into the connecting portions (42, 42) of both the pipes (40, 40), connection is made between each of the connecting portions (42, 42) and the connecting piece (60). In detail, when the pipe (40) is heated, the block plug (50) is melt so that the pipe (40) and the connecting piece (60) are brazed with each other. At this time, if the inner space of the pipe (40) is filled with inert gas (4a), the inside of the pipe (40) is brazed in an atmosphere of inert gas thereby completing the joint step.

Particularly, when a ring of brazing material (62) is fitted on the connecting piece (60), shortage of brazing material is prevented.

In the above-mentioned manner, pipes (40) are sequentially connected.

In the second and fourth aspects of the invention, for the connection of two pipes (40, 40), the connecting portion (42) of one of the pipes (40) is inserted into the connecting portion (42) of the other pipe (40). Then, when the pipe (40) is heated, the block plug (50) is melt so that the two pipes (40, 40) are brazed with each other.

In the third and fifth aspects of the invention, at the blockading step, the pipe (40) is formed in a way that the end piece (43) is jointed at the joint portion (44) of one end with the main portion (41) and the block plug (50) is fitted to the bagged portion (45) of the end piece (43).

Thereafter, the pipe connecting method proceeds to the piece inserting step, where the connecting piece (60) is inserted into the end pieces (43) of the two pipes (40, 40) to be connected. When the connecting piece (60) is inserted into the end piece (43), more than a half of the outer peripheral edge of the block plug (50) is broken. When the connecting piece (60) is further pushed into the end piece (43), a part of the outer peripheral edge of the block plug (50) is left without being cut away so that the block plug (50) is left between the end piece (43) and the connecting piece (60).

Then, the pipe connecting method proceeds to the joint step, where the pipes (40) are connected in a way of jointing the connecting piece (60) with the connecting portion (44) of the end piece (43) by jointing material such as brazing material.

Effects of the Invention

According to the present invention, since the block plugs (50) are respectively provided on both ends of the pipe (40) so that the inside of the pipe (40) is blockaded, this provides sufficient management of pipes (40). Accordingly, it can be prevented in advance that: a high humidity of air enters the pipe (40); and the pipe (40) is used with dew fall left on the inner surface thereof.

As a result, the mixture of water into refrigerant can be securely prevented. This allows the dry rule to be strictly observed thereby enhancing the reliability of refrigerating operation.

In particular, the above-mentioned effect is conspicuously exerted in the case of use of a refrigerant mixture containing flon gas R134a (1,1,1,2-tetrafluoroethane), HFC (hydrofluoro carbon) or the like as refrigerant. In detail, if flon gas R134a is used as refrigerant, it is required to use ester oil as lubricating oil for refrigerating apparatus. Ester oil has a high affinity for water so as to be chemically combined with water at a very high speed. The mixture of ester oil and water would produce carboxylic acid. Carboxylic acid has an effect of melting an insulation (enamel) of a compressor. Therefore, the dry rule must be strictly observed. The above invention can securely follow the dry rule.

Further, since no water is produced in the pipe (40), this prevents production of an oxide film in brazing. As a result, the clean rule can be strictly observed thereby enhancing the reliability of refrigerating operation.

In detail, when the pipes (40) which are copper pipes are connected to each other by brazing, an oxide film is formed on each pipe due to chemical combination between copper and oxygen. If such an oxide film is formed on the inner surface of the pipe (40), the oxide film is mixed into refrigerant and lubricating oil for refrigerating apparatus. The oxide film degrades the lubricity of the lubricating oil for refrigerating apparatus, clogs a capillary tube and an oil backing hole of an accumulator and acceleratedly wears compressor parts and the like, resulting in decrease in life time of the compressor. Therefore, the clean rule must be strictly observed. This invention can securely follow the clean rule.

Furthermore, since the block plug (50) is made of brazing material, it is not necessary to separately provide brazing material for brazing. This enables saving in material thereby achieving energy conservation.

In addition, since the block plug (50) is used as brazing material, this prevents alien substances from remaining after the connection of the pipes (40), thereby enhancing the reliability of refrigerating operation.

When the block plug (50) is shaped into a hat in cross section, the blockade of the pipe (40) can be securely made.

When the block plug (50) is press-fitted into the pipe (40), the fitting of the block plug (50) can be facilitated. This simplifies the fitting operation.

When the block plug (50) is ultrasonically bonded with the pipe (40), the block plug (50) can be securely fitted to the pipe (40). This increases the hermeticity of the pipe (40).

When the pipe (40) is filled with inert gas (4a), production of an oxide film in brazing can be securely prevented. This enables secure obedience of the clean rule.

When the connecting portion (42) of the pipe (40) is formed in a large diameter, the pipes (40, 40) can be connected to each other without decrease in pipe diameter due to the connecting piece (60).

When the pipe (40) is a copper pipe, working such as bending can be readily made. This provides easy construction of piping.

When the ends (61, 61) of the connecting piece (60) are each shaped into a point, breakage of the block plugs (50) can be readily made with the ends (61, 61). This accelerates and facilitates the pipe connecting work.

When the connecting piece (60) is provided with a ring of brazing material (62), shortage of brazing material can be securely prevented. This allows the connecting piece (60) to be securely jointed with the pipe (40), thereby enhancing the reliability of the pipe connecting work.

When both the pipes (40, 40) are connected in a way that the connecting portion (42) of one of the pipes (40) is inserted into the connecting portion (42) of the other pipe (40), the number of parts can be reduced. This further accelerates and facilitates the pipe connecting work.

BRIEF DESCRIPTION OF THE DRAWINGS

FIG. 1 is a diagram schematically showing a refrigerant piping system of an air conditioner.

FIG. 5 is a cross section of ends of the pipes showing the state that a connecting piece is inserted therein to.

FIG. 11 is a cross section of one end of a pipe showing the state that a block plug is fitted thereto in Embodiment 3.

FIG. 12 is a cross section of the end of the pipe showing the state that the block plug is broken in Embodiment 3.

FIG. 13 is a cross section of the end of the pipe showing the state that a connecting piece is fitted thereto in Embodiment 3.

DETAILED DESCRIPTION OF THE INVENTION

Figure 2:
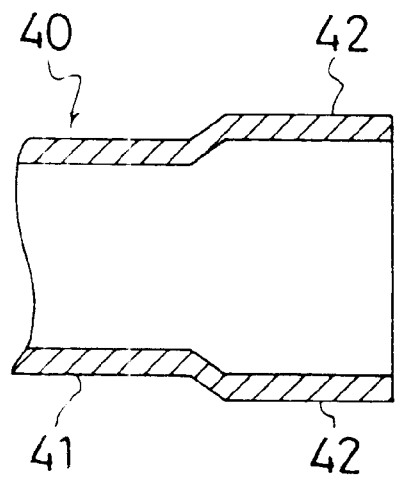
FIG. 2 is a cross section showing a necessary portion of the pipe.

Embodiments of the present invention will be described below with reference to the drawings.

Embodiment 1

As shown in FIG. 1, reference numeral (10) indicates a multi-type air conditioner as an refrigerating apparatus in which a plurality of (a maximum of 8) indoor units (30) are connected to a single outdoor unit (20) through a connection pipe (11) forming refrigerant piping.

The outdoor unit (20), not shown in detail, is provided with an outdoor-side refrigerant circuit (21) so composed that a compressor, a four-way selector valve, an outdoor heat exchanger with an outdoor fan, and an outdoor motor-operated expansion valve are connected through the refrigerant piping. At a part of the refrigerant piping of the outdoor-side refrigerant circuit (21) in the outdoor unit (20), a service port (22) is provided. At both ends of the outdoor-side refrigerant circuit (21) in the outdoor unit (20), shut-off valves (23, 23) are provided respectively.

The indoor unit (30), not shown in detail, is provided with an indoor-side refrigerant circuit (31) so composed that an indoor heat exchanger with an indoor fan and an indoor-side motor-operated expansion valve are connected through the refrigerant piping. The outdoor-side refrigerant circuit (21) and the indoor-side refrigerant circuit (31) are connected to each other through the connection pipe (11) thereby forming a refrigerant circulating system (12).

The above-mentioned air conditioner (10) circulates refrigerant in a way that in cooling operation, refrigerant discharged from the compressor is condensed by the outdoor heat exchanger, is reduced in pressure by the indoor motor-operated expansion valve, is evaporated by the indoor heat exchanger and is returned to the compressor, and in a way that in heating operation, refrigerant discharged from the compressor is condensed by the indoor heat exchanger, is reduced in pressure by the outdoor motor-operated expansion valve, is evaporated by the outdoor heat exchanger and is returned to the compressor.

Further, for refrigerant charged in the refrigerant circulation system (12), for example, flon gas R22 or flon gas R134a (1,1,1,2-tetrafluoroethane) is used. For lubricating oil for refrigerating apparatus charged in the compressor (not shown) of the outdoor unit (20), mineral oil is used in the case of use of flon gas R22, or ester oil as synthetic oil is used in the case of use of flon gas R134a.

The connection pipe (11) is formed by connecting a plurality of pipes (40, 40, . . . ). Out of the pipes (40), for example, a gas-side connection pipe (11) has a length of 4 m and a liquid-side connection pipe (11) has a length of 30 m.

Further, the connection pipe (11) is connected to the outdoor-side refrigerant circuit (21) and the indoor-side refrigerant circuit (31) through respective couplings (13) such as flared fitting and flange fitting. The adjacent pipes (40, 40, . . . ) are connected to each other by brazing.

Figure 3:
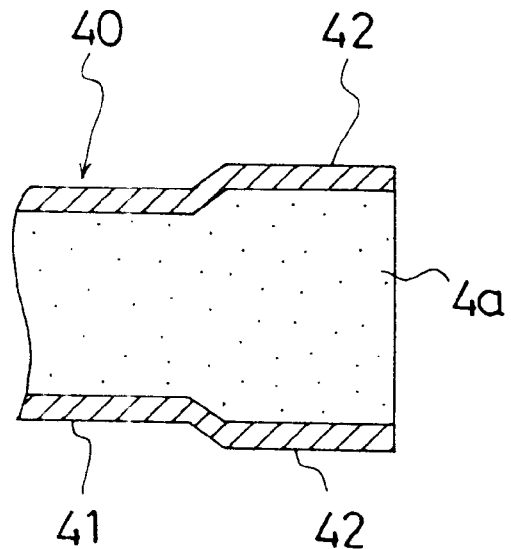
FIG. 3 is a cross section of one end of the pipe showing the state that the pipe is filled with nitrogen gas.
Figure 4:
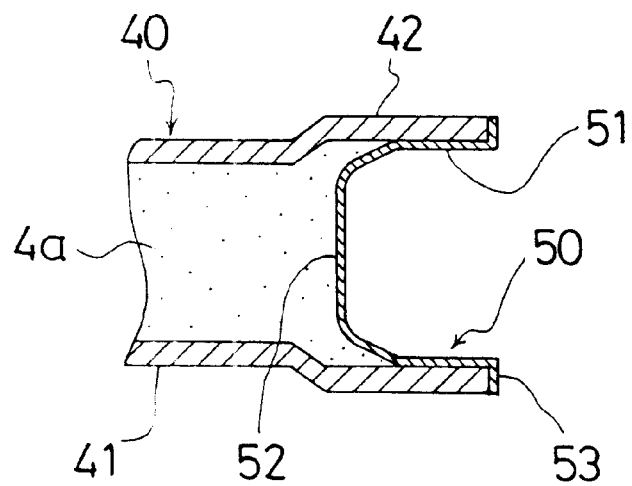
FIG. 4 is a cross section of one end of the pipe showing the state that a block plug is fitted thereto.

In one of features of the present invention, as shown in FIGS. 2 to 4. block plugs (50) are provided at both opening ends of the pipe (40) respectively. The pipe (40) is a clean copper pipe in which water and oil are removed from the inner surface thereof, and has a structure that connecting portions (42, 42) are formed at both ends of a main portion (41) respectively.

The main portion (41) is formed in a uniform diameter from one end to another end. The connecting portions (42, 42) are each flared so as to be formed in a diameter larger than that of the main portion (41).

Figure 8:
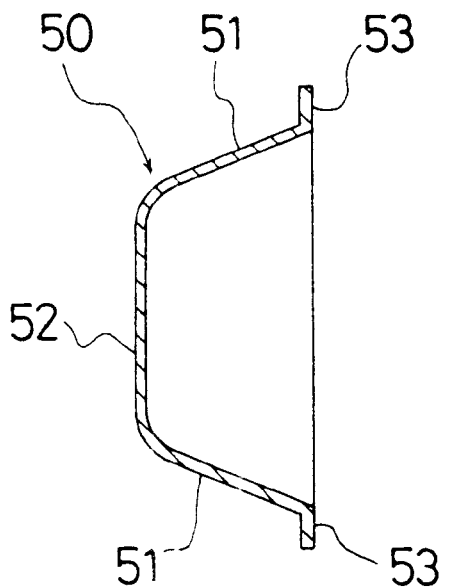
FIG. 8 is an enlarged cross section showing the block plug.
Figure 9:
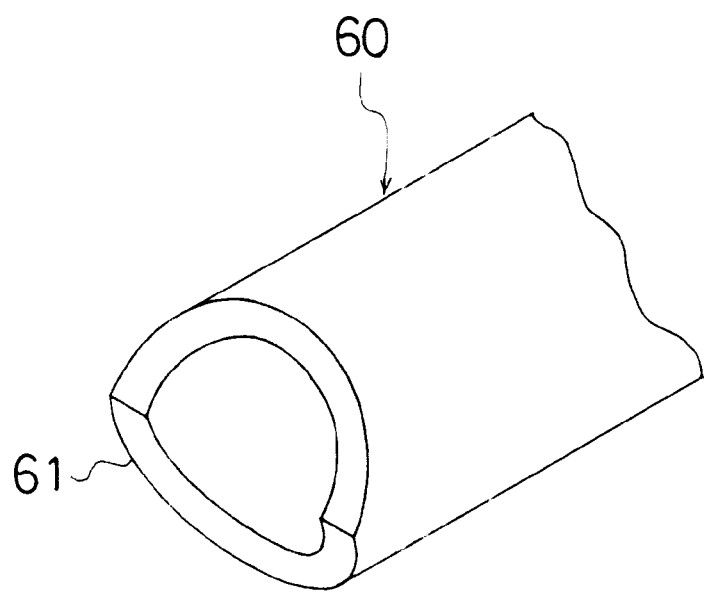
FIG. 9 is a partially cutaway view in perspective of the connecting piece.

As shown in FIG. 8, the block plug (50), which is the most important feature of the present invention, is fitted to each of the connecting portions (42, 42) in a way to be press-fitted into each of the connecting portions (42, 42) of the pipe (40) from their opening ends.

The block plug (50) is a metallic film and more specifically is made of brazing material. The block plug (50) is shaped into a hat in cross section in a way that its trunk portion (51) like a truncated cone is formed so as to be continuous at one end (inner end) thereof with a top portion (52) and is formed so as to be continuous at the other end (outer end) with a flange portion (53) directed outward.

Further, the trunk portion (51) of the block plug (50) adheres closely to the inner periphery of the end of the connecting portion (42) and concurrently the flange portion (53) adheres closely to the end surface of the connecting portion (42), thereby sealing the pipe (40). Nitrogen gas (4a) as inert gas is poured into the pipe (40) before the fitting of the block plug (50) so that the pipe (40) is filled with the nitrogen gas (4a).

The adjacent pipes (40, 40, . . . ) are connected at each of the connecting portions (42, 42) to each other through a connecting piece (60).

Figure 5:
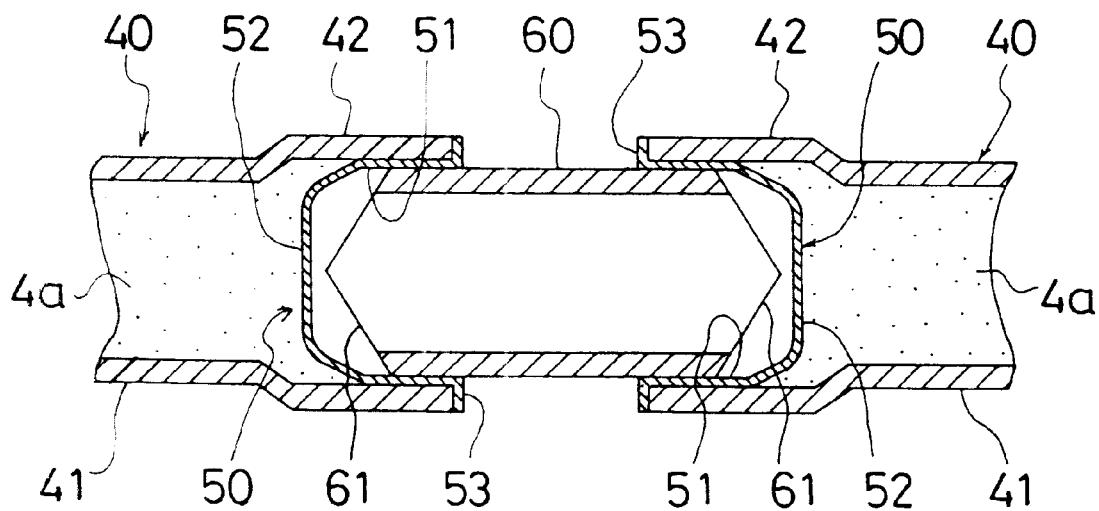
Figure 6:
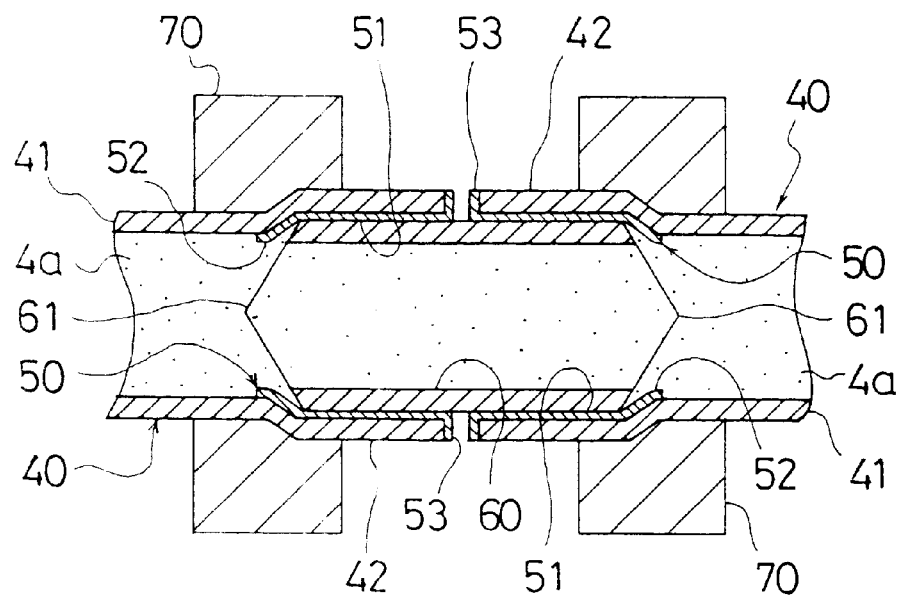
FIG. 6 is a cross section of the ends of the pipes showing the state that the connecting piece is jointed therewith.
Figure 7:
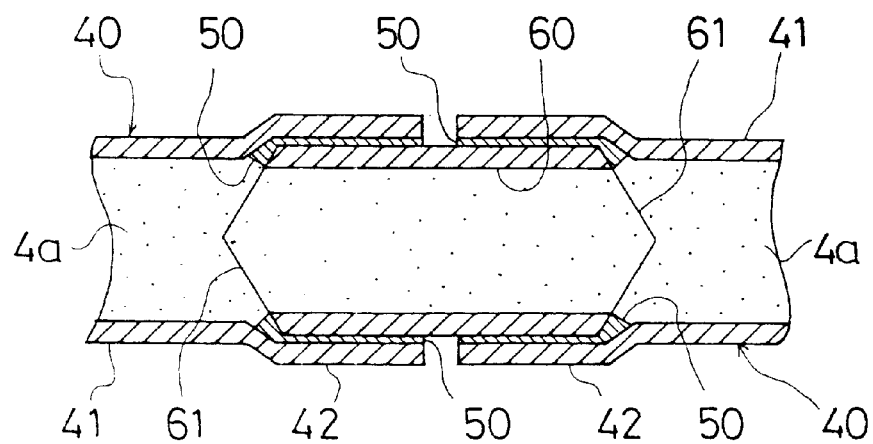
FIG. 7 is a cross section of the ends of the pipes showing the state that the ends are connected to each other.

As shown in FIGS. 5 to 7, the connecting piece (60) is inserted at one end thereof into the connecting portion (42) of one pipe (40) and at the other end into the connecting portion (42) of another pipe (40) with the use of connecting tools (70) respectively. The outer periphery of the connecting piece (60) is brazed with the inner peripheries of the connecting portions (42, 42) so that the two pipes (40, 40) are connected.

As shown in FIG. 8, the connecting piece (60) is formed into a short pipe whose outer diameter is slightly smaller than the inner diameter of the connecting portion (42) of the pipe (40), and each of ends (61, 61) thereof is shaped into a wedge (V-shaped) point in side view so as to be bias cut from both opposite sides. The insertion of the connecting piece (60) into the connecting portions (42, 42) of the pipes (40, 40) is made in a way that the connecting piece (60) is concurrently inserted into both the pipes (40, 40) with the use of the connecting tools (70) in the state that it is inserted into the trunk portions (51) of the block plugs (50) fitted to the connecting portions (42). The insertion of the connecting piece (60) causes the block plugs (50) to be broken.

Further, when the pipes (40) are heated by a burner in order to connect the connecting piece (60) and the pipes (40), the block plugs (50) are melt into brazing material so that the connecting piece (60) can be brazed with the pipes (40) through the block plugs (50).

Pipe Connecting Method

Next, description is made about a pipe connecting method of the above-mentioned air conditioner (10).

First, the outdoor unit (20) and the indoor units (30) are installed at given places in a building or the like and the connection pipe (11) is then connected to the outdoor-side refrigerant circuit (21) and the indoor-side refrigerant circuit (31) through the couplings (13).

At the time, the connection pipe (11) is formed in a way of connecting a multiplicity of pipes (40) to one another.

Here, detailed description is made about a connecting operation of the pipes (40).

First, the pipe (40) is subjected to a blockading step. For example, an original pipe with a uniform diameter from which water and oil are removed is formed, and as shown in FIG. 2, both ends of the original pipe are then flared thereby forming connecting portions (42, 42) continuous with a main portion (41).

Thereafter, as shown in FIG. 3, nitrogen gas (4a) is charged into the pipe (40).

Subsequently, in the state that the pipe (40) is filled with nitrogen gas (4a), as shown in FIG. 4, the trunk portions (51) of the block plugs (50) formed in another step are press-fitted into the connecting portions (42, 42) from their opening ends respectively so that the block plugs (50) are fitted to the pipe (40) so as to seal the pipe (40) by the block plugs (50), thereby completing the blockading step.

The pipes (40) which are each provided with block plugs (50) and are each filled with nitrogen gas (4a) are stored in a plant or the like and are then carried to the site of installation of the air conditioner (10) by a specific pipe count.

Thereafter, at the site of installation, apiece inserting step is started. As shown in FIG. 5, for the connection of two pipes (40, 40), one end of the connecting piece (60) is inserted into the trunk portion (51) of the block plug (50) fitted to the connecting portion (42) of one pipe (40), and the other end of the connecting piece (60) is inserted into the trunk portion (51) of the block plug (50) fitted to the connecting portion (42) of the other pipe (40).

Subsequently, the adjacent ends of the two pipes (40, 40) are each held by the connecting tool (70) and the two pipes (40, 40) are moved toward each other. In detail, as shown in FIG. 6, the connecting piece (60) is concurrently pushed into the connecting portions (42, 42) of both the pipes (40, 40). At the time, the push-in of the connecting piece (60) provides breakage of the block plugs (50) by the connecting piece (60) since the connecting piece (60) has both ends (61) each shaped into a wedge point.

In this state, the block plugs (50) made of brazing material are interposed between the connecting piece (60) and the connecting portions (42, 42) of the pipes (40) respectively.

Next, the pipe connecting method proceeds from the piece inserting step to a joint step. When the pipes (40) are heated by a burner in the state that the connecting piece (60) is pushed in the connecting portions (42, 42) of both the pipes (40, 40), as shown in FIG. 7, the block plugs (50) are melt so that the pipes (40) are brazed with the connecting piece (60). At the time, since the pipes (40) are filled with nitrogen gas (4a), the inner space of each pipe (40) is brazed under nitrogen gas atmosphere thereby completing the joint step.

Such a connection between the pipes (40) is made one after another thereby resulting in formation of the connection pipe (11). As mentioned above, the connection pipe (11) is then connected to the outdoor unit and the indoor units. Thereafter, the inner space of the connection pipe (11) is sucked into a vacuum and refrigerant is charged in the connection pipe (11), thereby completing construction in relation to the air conditioner (10).

Effects of Pipe Connection in Embodiment 1

As mentioned so far, according to the present embodiment, since the block plugs (50) are respectively provided on both ends of the pipe (40) so that the inside of the pipe (40) is blockaded, this enables sufficient management of pipes (40). Accordingly, it can be prevented in advance that: a high humidity of air enters the pipe (40); and the pipe (40) is used with dew fall left on the inner surface thereof.

As a result, since the mixture of water into refrigerant can be securely prevented, the dry rule can be strictly observed thereby enhancing the reliability of air conditioning.

In particular, the above-mentioned effect is conspicuously exerted in the case of use of a refrigerant mixture containing flon gas R134a, HFC or the like as refrigerant. In detail, if flon gas R134a is used as refrigerant, it is required to use ester oil as lubricating oil for refrigerating apparatus. Ester oil has a high affinity for water so as to be chemically combined with water at a very high speed. The mixture of ester oil and water would produce carboxylic acid. If carboxylic acid exists in the refrigerant circulating system (12), it has an effect of melting an insulation (enamel) of a compressor provided in the outdoor unit (20). Therefore, the dry rule must be strictly observed. The above embodiment can securely follow the dry rule.

Further, since no water is produced in the pipe (40), production of an oxide film in brazing can be prevented. As a result, the clean rule can be strictly observed thereby enhancing the reliability of air conditioning.

In detail, when the pipes (40) which are copper pipes are connected to each other by brazing, an oxide film is formed on each pipe due to chemical combination between copper and oxygen. If such an oxide film is formed on the inner surface of the pipe (40), the oxide film is mixed into refrigerant and lubricating oil for refrigerating apparatus. The oxide film degrades the lubricity of the lubricating oil for refrigerating apparatus, clogs a capillary tube and an oil backing hole of an accumulator and acceleratedly wears compressor parts and the like, resulting in decrease in life time of the compressor. Therefore, the clean rule must be strictly observed. The present embodiment can securely follow the clean rule.

Furthermore, since the block plug (50) is made of brazing material, it is not necessary to separately provide brazing material for brazing. This enables saving in material thereby achieving energy conservation.

In addition, since the block plug (50) is used as brazing material, this prevents alien substances from remaining after the connection of the pipes (40). This enhances the reliability of air conditioning.

Since the block plug (50) is shaped into a hat in cross section, the blockade of the pipe (40) can be securely made.

Further, since the block plug (50) is press-fitted into the pipe (40), the fitting of the block plug (50) can be facilitated. This simplifies the fitting operation.

Furthermore, since the pipe (40) is filled with nitrogen gas (4a), production of an oxide film in brazing can be securely prevented. This enables secure obedience of the clean rule.

Since the connecting portion (42) of the pipe (40) is formed in a large diameter, the pipes (40, 40) can be connected to each other without decrease in pipe diameter due to the connecting piece (60).

Further, since the pipe (40) is a copper pipe, working such as bending can be readily made. This provides easy construction of piping.

Furthermore, since the ends (61, 61) of the connecting piece (60) is shaped into a point, breakage of the block plugs (50) can be readily made with the ends (61, 61). This accelerates and facilitates the pipe connecting work.

Embodiment 2

Figure 10:
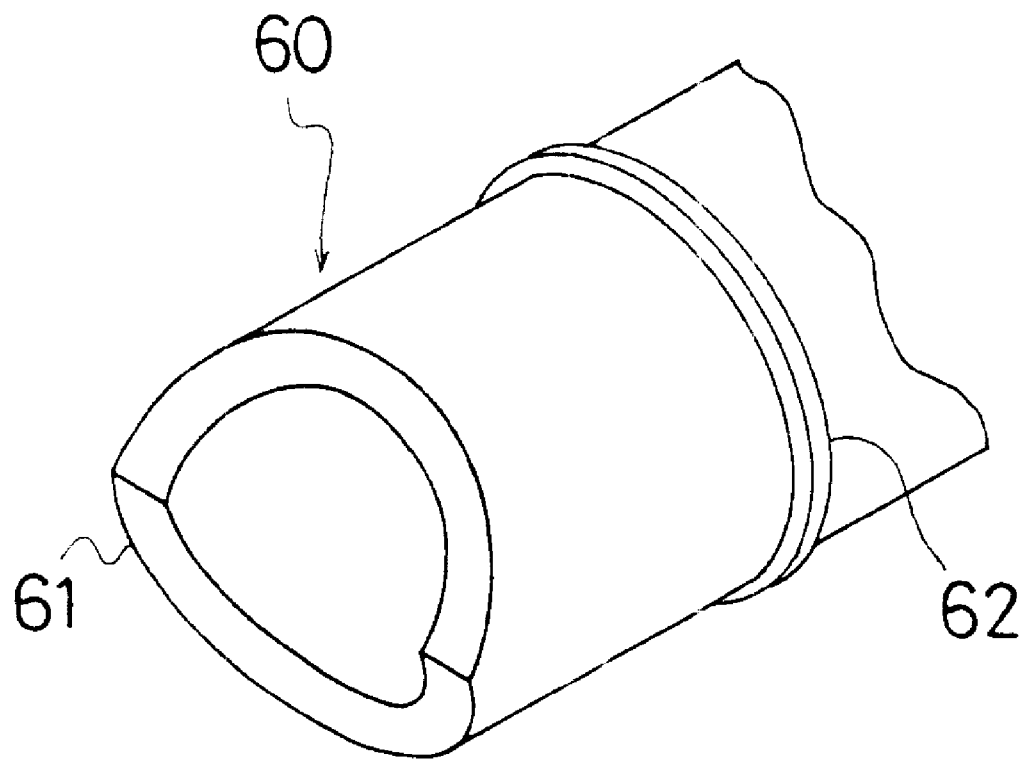
FIG. 10 is a partially cutaway view in perspective of the connecting piece on which a ring of brazing material is provided in Embodiment 2.

As shown in FIG. 10, this embodiment has a structure that the connecting piece (60) is provided with a ring of brazing material (62).

The ring of brazing material (62) is fitted on the outer periphery of the middle portion of the connecting piece (60) and is adapted so as to adhere closely to the end surface of the connecting portion (42) of the pipe (40) when the connecting piece (60) is inserted into the connecting portion (42).

When the pipe (40) is heated by a burner in order to connect the pipe (40) and the connecting piece (60), the block plug (50) is melt and concurrently the ring of brazing material (62) is also melt thereby additionally applying brazing material to the pipe (40).

The reason for provision of the ring of brazing material (62) is as follows: It is essential only that the block plug (50) has a strength capable of blockading each opening end of the pipe (40), or such a thickness. Further, brazing material exerts a better penetrativity as the distance between the pipe (40) and the connecting piece (60) is narrowed. Accordingly, the thinner the block plug (50) is, the better it is. If the block plug (50) becomes thin, this may cause short of brazing material. Therefore, the ring of brazing material is provided as additional brazing material.

According to the present embodiment, shortage of brazing material can be securely prevented so that the connecting piece (60) can be securely jointed with the pipe (40). This provides enhanced reliability of the connecting work.

Other structures, operations and effects are the same as in Embodiment 1.

Embodiment 3

As shown in FIGS. 11 to 13, this embodiment shows another form of the block plug (50). In detail, the block plug (50) of this embodiment is shaped into a disk composed of a plane portion (54) and a flange portion (55) instead of the block plug (50) including the trunk portion (51) of Embodiment 1.

The plane portion (54) is formed in the shape corresponding to the cross-sectional surface of the connecting portion (42) of the pipe (40).

The flange portion (55) is formed in the shape of U in cross section. The flange portion (55) is also formed so as to be press-fitted into the connecting portion (42) of the pipe (40) from the outer peripheral edge thereof.

The block plug (50) is adapted so as to be broken by a breaking tool (71) in the connection of the pipes. The breaking tool (71) is shaped into a thumbtack in a way that its tip end is formed in the shape of a cone.

Figure 14:
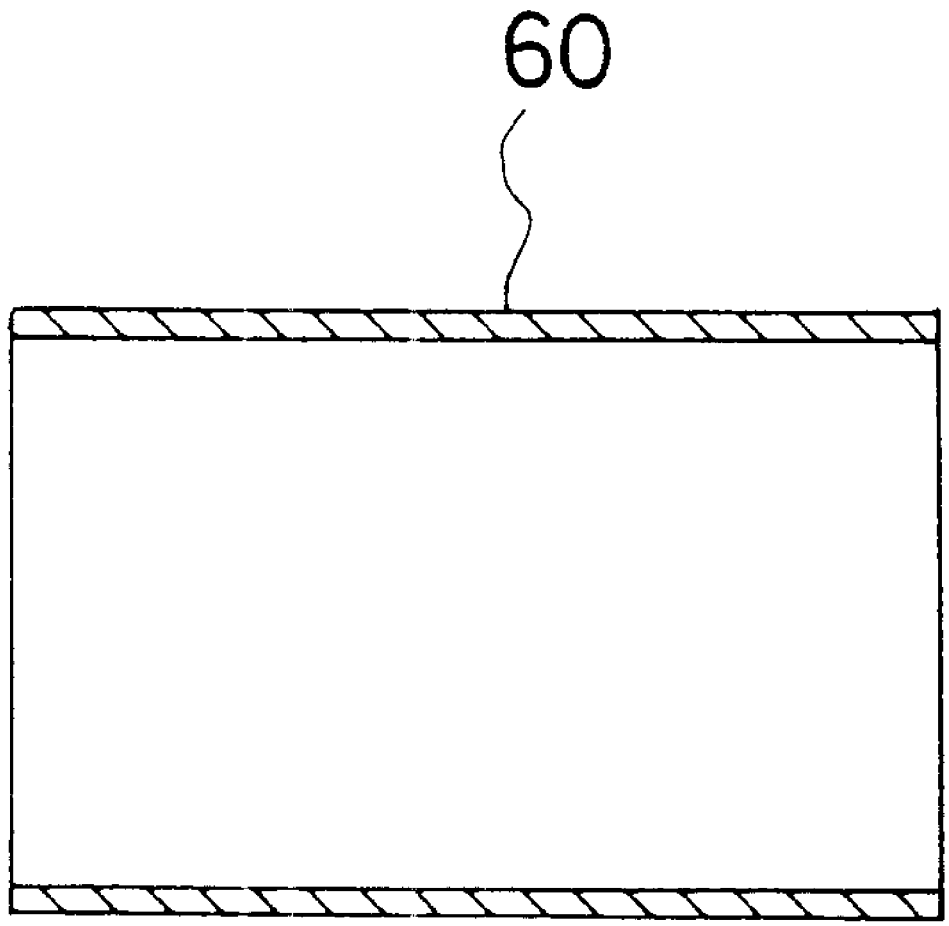
FIG. 14 is a cross section showing the connecting piece of Embodiment 3.

As shown in FIG. 14, the connecting piece (60) is composed of a short pipe which has a uniform diameter from one end to another end.

Accordingly, in the case of connection of the pipes (40), each block plug (50) is broken by the breaking tool (71) as shown in FIG. 12, and thereafter the connecting piece (60) is inserted into the connecting portion (42) of each pipe (40) as shown in FIG. 13. Then, the pipe (40) is heated by a burner so as to be jointed with the connecting piece (60).

Other structures, operations and effects are the same as in Embodiment 1.

Embodiment 4

Figure 15:
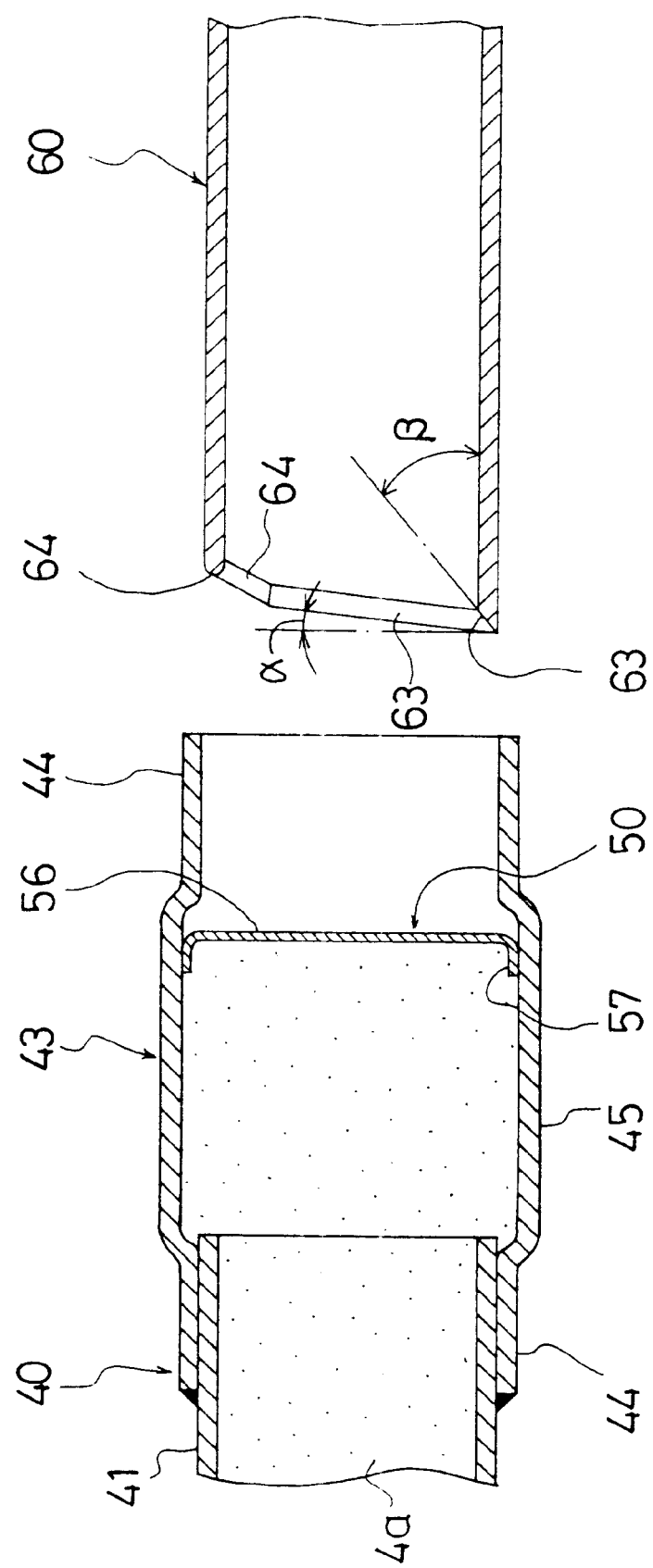
FIG. 15 is a cross section showing a connecting piece and one end of a pipe in Embodiment 4.
Figure 16:
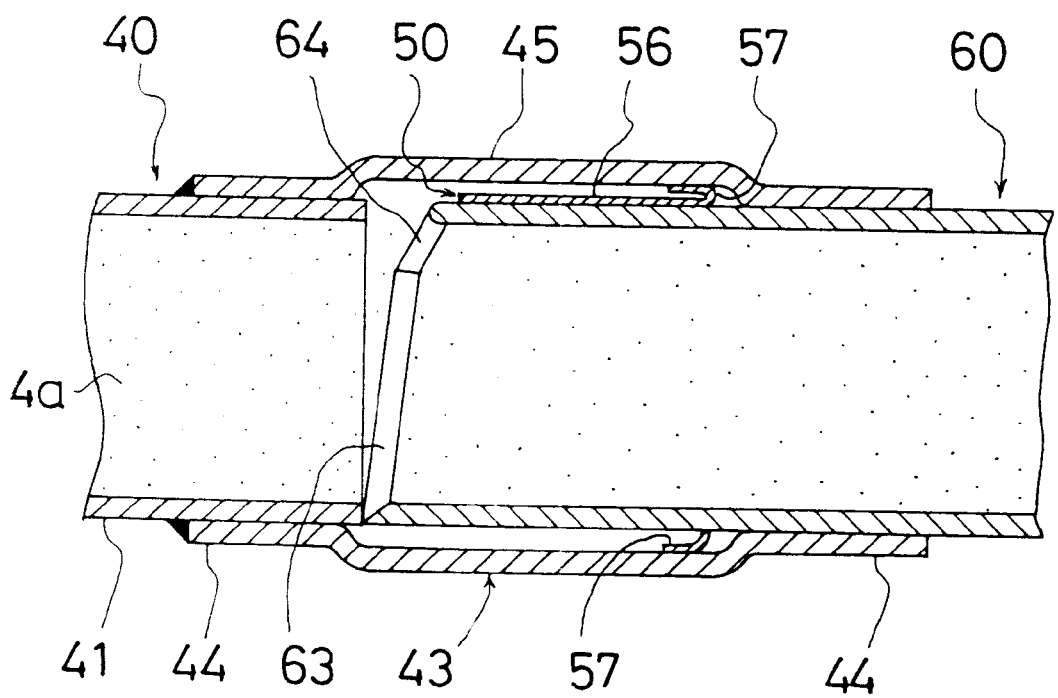
FIG. 16 is a cross section of the end of the pipe showing the state that the connecting piece is fitted thereto in Embodiment 4.

In this embodiment, as shown in FIGS. 15 and 16, the block plug (50) is made of copper which is the same material used for the pipe (40).

More specifically, the pipe (40) is composed of a main portion (41) and an end piece (43).

In the end piece (43), both ends are formed into joint portions (44, 44) and an intermediate portion between the joint portions (44, 44) is formed into a bagged portion (45) larger in diameter than the joint portion (44). Thereby, the end piece (43) forms a connecting portion in the shape of a short pipe. Further, in the end piece (43), one of the joint portions (44) is fitted on the main portion (41) of the pipe (40) and is then brazed, while the other joint portion (44) is opened.

The block plug (50) is so composed that a flange portion (57) is formed at the outer peripheral edge of a disk-shaped plane portion (56) corresponding to the cross-sectional surface of the bagged portion (45). The block plug (50) is press-fitted at the flange portion (57) into the bagged portion (45). Further, the block plug (50) is shaped into a thin film made of copper which is the same material used for the pipe (40).

The connecting piece (60) is formed of a short pipe whose diameter is uniform from one end to another end. On its end surface, a blade part (63) and a scoop part (64) are formed.

The blade part (63) is for breaking the block plug (50) and is formed, over more than a half of the end surface of the connecting piece (60), into a single edge inwardly inclined at an angle of $\beta$. Further, the blade part (63) is inclined at an angle of $\alpha$ from circumferentially extreme end point projecting most outwardly (lower end of FIG. 15) toward both circumferential ends (upper end of FIG. 15).

The scoop part (64) is for scooping the block plug (50) without cutting it away to leave it in the bagged portion (45) of the end piece (43). The scoop part (64) is formed so as to be continuous with the blade part (63) and is shaped into an arc in end surface.

Pipe Connecting Method of Embodiment 4

First, in a blockading step, the end piece (43) is jointed at one joint portion (44) thereof with the main portion (41) and the block plug (50) is fitted to the bagged portion (45) of the end piece (43), thereby forming the pipe (40).

When the pipe (40) is carried to the site of installation of the air conditioner (10), the pipe connecting method proceeds to the piece inserting step, in which the connecting piece (60) is inserted into end pieces (43) of two pipes (40, 40) to be connected. When the connecting piece (60) is inserted into the end piece (43), the blade part (63) formed on the end surface of the connecting piece (60) breaks more than a half of the outer peripheral edge of the block plug (50) (approximately a lower half in FIG. 15).

When the connecting piece (60) is further pushed into the end piece (43), a portion of the outer peripheral edge of the block plug (50) (an upper portion in FIG. 15) is left, corresponding to the scoop part (64), without being cut away. As a result, as shown in FIG. 16, the block plug (50) remains left between the end piece (43) and the connecting piece (60).

Thereafter, the pipe connecting method proceeds to the joint step, in which the connecting piece (60) is brazed with the joint portions (44) of both the end pieces (43) so that the pipes (40) are connected to each other. The above operation is repeated to form the connection pipe (11).

Effects of Pipe Connection in Embodiment 4

As mentioned so far, according to the present embodiment, since the block plug (50) made of copper is fitted to the end piece (43), the pipe (40) can be blockaded at the end surfaces though the block plug (50) is left inside the pipe (40) after the connection of pipes (40). This securely prevents production of dew fall inside the pipe (40).

As a result, similarly to Embodiment 1, the dry rule and the clean rule can be strictly observed in the pipe connecting work.

Embodiment 5

Figure 17:
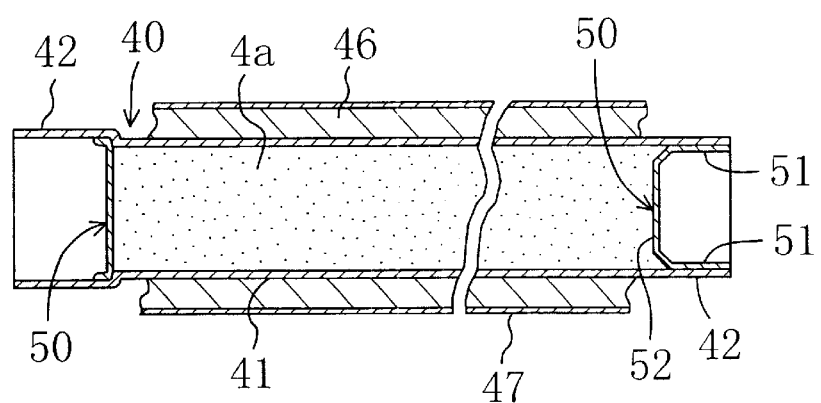
FIG. 17 is a cross section of pipes in Embodiment 5.
Figure 18:
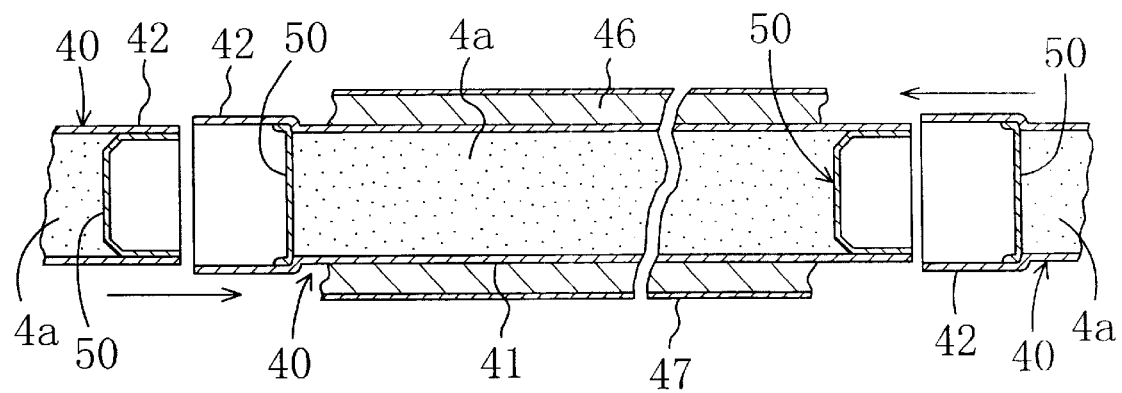
FIG. 18 is a cross section of pipes showing a pipe connecting operation in Embodiment 5.

As shown in FIGS. 17 and 18, this embodiment is so arranged that two pipes (40, 40) are directly connected without the use of the connecting piece (60) of Embodiment 1.

More specifically, the pipe (40) is so composed that connecting portions (42, 42) are formed at both ends of a main portion (41). The main portion (41) is formed in a uniform diameter from one end to another end.

One of the connecting portions (42) is flared into a large-diameter connecting portion (42) larger in diameter than the main portion (41). The other connecting portion (42) is formed into a small-diameter connecting portion (42) identical in diameter with the main portion (41).

The large-diameter and small-diameter connecting portions (42) are provided with block plugs (50) formed of films of brazing material respectively.

The block plug (50) of the large-diameter connecting portion (42) is provided in a press-fitting manner at a step portion where the main portion (41) and the large-diameter connecting portion (42) are continuously located. The block plug (50) is substantially shaped into a disk. The outer peripheral edge of the block plug (50) adheres closely to the step portion.

The block plug (50) of the small-diameter connecting portion (42) is press-fitted into the connection portion (42) of the pipe (40) from its opening end.

The block plug (50) is so composed that its trunk portion (51) like a truncated cone is formed so as to be continuous at one end (inner end) thereof with a top portion (52). The trunk portion (51) adheres closely to the inner periphery of the end of the connecting portion (42).

The pipe (40) is filled with nitrogen gas (4a) as inert gas before the fitting of both the block plugs (50, 50).

The small-diameter connecting portion (42) of one pipe (40) is inserted into the large-diameter connecting portion (42) of another pipe (40). The outer pipe (40) is heated by a burner so that the block plug (50) is melt. Thereby, both the connecting portions (42, 42) are brazed with each other so that both the pipes (40, 40) are connected.

An insulating member (46) is provided around the pipe (40). A cover member (47) is provided around the insulating member (46).

Pipe Connecting Method

Next, description is made about a connecting operation of the pipes (40).

First, the pipe (40) is flared thereby forming a large-diameter connecting portion (42) and is filled with nitrogen gas (4a). The block plug (50) is fitted to the pipe (40) thereby completing a blockading step.

Thereafter, at the site of installation, a piece inserting step is started. As shown in FIG. 18, for the connection of two pipes (40, 40), the small-diameter connecting portion (42) of one of the pipes (40) is inserted into the large-diameter connecting portion (42) of the other pipe (40) so that the end surface of the small-diameter connecting portion (42) is made contact with the block plug (50) of the large-diameter connecting portion (42).

Subsequently, the pipe connecting operation proceeds to a joint step. In this step, the connecting portions (42, 42) of the pipes (40, 40) are externally heated by a burner. The heating of the pipes (40, 40) causes the block plug (50) to be melt so that both the pipes (40, 40) are brazed with each other. At the time, since the pipe (40) is filled with nitrogen gas (4a), the inner space of the pipe (40) is brazed under nitrogen gas atmosphere.

Effects of Pipe Connection in Embodiment 5

As mentioned so far, according to the present embodiment, since both the pipes (40, 40) are connected in a way that the connecting portion (42) of one pipe (40) is inserted into the connecting portion (42) of another pipe (40), the number of parts can be reduced. This further accelerates and facilitates the pipe connecting work.

Other structures, operations and effects are the same as in Embodiment 1.

Other Embodiments

In each of Embodiments 1 to 3, the connecting portions (42, 42) are each formed in a diameter larger than that of the main portion (41) by flaring. In the present invention, however, the connecting portions (42, 42) may has the same diameter as in the main portion (41). Alternately, the connecting portion (42) may be enlarged in diameter in two stages for the purpose of increase in diameter of the connection pipe (11) at its intermediate part or may be formed less in diameter than the main portion (41) for the purpose of decrease in diameter of the connection pipe (11) at its intermediate part.

Further, in each of Embodiments 1 to 3, the block plug (50) is shaped into a hat or a disk in cross section. However, the block plug (50) may have various forms such as a slightly outwardly projecting form, a cap and a simple disk. In other words, it is essential only that the block plug (50) has a shape capable of blockading the pipe (40) and capable of interposing between the connecting piece (60) and the pipe (40), for brazing, through the insertion of the connecting piece (60) into the pipe (40).

In each of Embodiments 1 to 5, the block plug (50) is press-fitted into the pipe (40). However, the block plug (50) may be ultrasonically bonded at the outer peripheral edge thereof to the pipe (40). The ultrasonic bonding makes it possible to shape the block plug (50) into a simple disk and to securely fit the block plug (50) to the pipe (40), thereby enhancing the hermeticity of the pipe (40).

Further, the connecting piece (60) may have an end surface with a wedge point, may be like a simple pipe or may have an end surface bias cut into a round edge. In other words, it is essential only that the connecting piece (60) is capable of breaking the block plug (50) so as to interpose the broken block plug (50) between the connecting piece (60) and the pipe (40).

Furthermore, it is a matter of course that the pipe (40) may have different-shaped block plugs (50) at both the ends so as to be connected at both the ends to different diameter pipes (40).

The pipe (40) is not limited to a copper pipe and may be instead made of various kinds of material such as an iron pipe.

The pipe (40) is not limited to the connection pipe (11) for communication between the outdoor unit (20) and the indoor unit (30) and may be instead a refrigerant pipe located inside the outdoor unit (20).

Further, the pipe (40) is not limited to a pipe for air conditioner (10) and may be applicable to various kinds of pipes.

The block plug (50) of Embodiment 4 may be made of various kinds of metallic films instead of copper.

Nitrogen gas (4a) may not necessarily be charged into the pipe (40). Instead of nitrogen gas (4a), inert gas such as argon gas may be used.

The breaking tool (71) of Embodiment 2 is not necessarily a special-purpose tool and may be a general-purpose tool such as a driver.

In each of the above embodiments, the block plugs (50) are provided at both ends of the pipe (40) respectively. However, the block plug (50) may be provided only at one end of the pipe (40). In other words, each of the above embodiments describes a linear pipe (40). However, the pipe (40) of the present invention may be a pipe (40) for dividing a flow of refrigerant into plural flows. In this case, when the pipe (40) is provided at at least one end thereof with an element such as a shout-off valve, the pipe (40) is provided only at the other ends with the block plugs (50).

In Embodiment 5, a single pipe (40) has a large-diameter connecting portion (42) and a small-diameter connecting portion (42) formed at both ends thereof respectively. However, large-diameter connecting portions (42) may be formed at both ends of the pipe (40) respectively. Alternatively, small-diameter connecting portions (42) may be formed at both ends of the pipe (40) respectively. In these case, the pipe (40) having large-diameter connecting portions (42) and the pipe (40) having small-diameter connecting portions (42) are alternately connected.

Small-diameter connecting portions (42) may be formed at both ends of the pipe (40) respectively, and at least two kinds of pipes (40) having different diameters may be prepared. In this case, the adjacent pipes (40, 40) are connected in a way that the pipe (40) with a smaller diameter is inserted into the pipe (40) with a larger diameter.

The block plug (50) in Embodiments 1, 2, 3 and 5 may be made of copper phosphorus brazing material or copper-zinc brazing material. Copper phosphorus brazing material and copper-zinc brazing material are different in composition from brass used for general machine parts.

An example of copper phosphorus brazing material is AWS (American Welding Standard) A5.8BCuP-5 (Ag:14.5%–15.5%, P:4.8%–5.3%, Cu:remainder). This material has a liquidus of 800° C. and a solidus of 645° C. In other words, copper phosphorus brazing material melts at 800° C. and solidifies at 645° C. Since copper phosphorus brazing material has a difference between a temperature that all parts melt and a temperature that all parts solidify, it is suitable for brazing.

Examples of copper-zinc brazing material are AWS A5.8BCuZn-D (Cu:46%–50%, Ni:9%–11%, Pb:0.05% or less, Al:0.01% or less, P:0.25% or less, Si:0.04%–0.25%, Zn:remainder) with a liquidus of 935° C. and a solidus of 920° C. and AWS A5.8RBCuZn-A (Cu:57%–61%, Sn:0.25%–1%, Pb:0.05% or less, Al:0.01% or less, Zn:remainder) with a liquidus of 900° C. and a solidus of 890° C.

On the other hand, a typical composition of brass used for general machine parts is Cu:68.5%–71.5%, Pb:0.05% or less, Fe:0.05% or less, and Zn:remainder. Its liquidus and solidus are equal in a range of 916° C. to 954° C. Thus, since the melting point of brass is equal to the solidifying point thereof, brass is not suitable for brazing.

In particular, since copper phosphorus brazing material has a property of eroding copper as base material, this realizes brazing without the use of flux. Since copper-zinc brazing material has no property of eroding copper and zinc is rendered in the form of a paper through the application of heat, this material requires flux for brazing. The flux may be left as contamination in the pipe (40) after brazing. Accordingly, copper phosphorus brazing material is suitable for the block plug (50) of the present invention.

[Industrial Field of Utilization]

As mentioned so far, the pipe connecting method and the piping structure of the present invention are useful for connection of refrigerant pipes for air conditioner and refrigerating apparatus and in particular are suitable for piping work performed so as not to leave water in a pipe.

What is claimed is:

1. A pipe connecting method comprising:

fitting a block plug (50) made of a film of brazing material to a connecting portion (42) continuously located on at least one end side of a main portion (41) of a pipe (40) formed in a specific length such that the outer periphery of the block plug (50) adheres closely to the connecting portion (42) thereby defining the inside and outside of the pipe (40);

inserting a connecting portion (42) of a different pipe (40) into the connecting portion (42) of the pipe (40) to contact the block plug (50) fitted to the pipe (40) with an end of the different pipe (40); and externally heating the connecting portion (42) of the pipe (40) to melt the block plug (50) thereby jointing both the connecting portions (42) of the pipes (40) through the block plug (50).

2. A pipe connecting method according to claim 1, wherein the connecting portions (42) of the pipe (40) are formed at both ends of the main portion (41) of the pipe (40) in a way to be continuous with the ends of the main portion (41), respectively, and both the connecting portions (42) each have the block plug (50) so that the inside of the pipe (40) is enclosed.

3. A pipe connecting method according to claim 2, wherein the pipe (40) is filled with inert gas (4a) with the inside thereof enclosed by the block plugs (50).

4. A pipe connecting method according to claim 1, wherein the connecting portions (42) of the pipe (40) are formed at both ends of the main portion (41) of the pipe (40) in a way to be continuous with the ends of the main portion (41), respectively, one of the connecting portions (42) is formed into a large-diameter connecting portion larger in diameter than the main portion (41), the other connecting portion (42) is formed into a small-diameter connecting portion identical in diameter with the main portion (41), and the small-diameter connecting portion (42) of the pipe (40) is inserted into the large-diameter connecting portion (42) of another pipe (40) and both the connecting portions (42, 42) are then jointed.

5. A pipe connecting method according to claim 1, wherein the block plug (50) is press-fitted into the connecting portion (42).

6. A pipe connecting method according to claim 1, wherein the block plug (50) is ultrasonically bonded with the connecting portion (42).

7. A pipe connecting method according to claim 1, wherein the pipe (40) is a copper pipe.

8. A pipe connecting method according to claim 1, wherein the pipe (40) is a refrigerant pipe for refrigerating apparatus (10).

9. A piping structure comprising:

a pipe (40) formed in a specific length; and a block plug (50) made of a film of brazing material for jointing the pipe (40) with a second pipe (40) by melting through the application of heat, the block plug (50) being fitted to an opening end of a connecting portion (42) continuously located on at least one end side of a main portion (41) of the pipe (40) in a way that the outer periphery of the block plug (50) adheres closely to the opening end of the connecting portion (42) thereby defining the inside and outside of the pipe (40); wherein the connecting portion (42) of the pipe (40) is inserted into the connecting portion (42) of the second pipe (40) to a position that an end of the pipe (40) comes into contact with the block plug (50) fitted to the pipe (40), and the connecting portion (42) of the pipe (40) located outside is externally heated so that the block plug (50) is melt thereby jointing both the connecting portions (42) of the pipe and second pipe (40) through the block plug (50).

10. A piping structure according to claim 9, wherein the connecting portions (42) of the pipe (40) are formed at both ends of the main portion (41) of the pipe (40) in a way to be continuous with the ends of the main portion (41), respectively, one of the connecting portions (42) is formed into a large-diameter connecting portion larger in diameter than the main portion (41), the other connecting portion (42) is formed into a small-diameter connecting portion identical in diameter with the main portion (41), and the small-diameter connecting portion (42) of the pipe (40) is inserted into the large-diameter connecting portion (42) of another pipe (40) and both the connecting portions (42, 42) are then jointed.

11. A piping structure comprising:

a pipe (40) formed in a specific length; and a block plug (50) made of a film of brazing material for jointing the pipe (40) with a second pipe (40) by melting through the application of heat, the block plug (50) being fitted to an opening end of a connecting portion (42) continuously located on at least one end side of a main portion (41) of the pipe (40) in a way that the outer periphery of the block plug (50) adheres closely to the opening end of the connecting portion (42) thereby defining the inside and outside of the pipe (40); wherein the connecting portions (42) of the pipe (40) are formed at both ends of the main portion (41) of the pipe (40) in a way to be continuous with the ends of the main portion (41), respectively, and both the connecting portions (42) each have the block plug (50) so that the inside of the pipe (40) is enclosed.

12. A piping structure according to claim 11, wherein the pipe (40) is filled with inert gas (4a) with the inside thereof enclosed by the block plug (50).

13. A piping structure comprising:

a pipe (40) formed in a specific length; and a block plug (50) made of a film of brazing material for jointing the pipe (40) with a second pipe (40) by melting through the application of heat, the block plug (50) being fitted to an opening end of a connecting portion (42) continuously located on at least one end side of a main portion (41) of the pipe (40) in a way that the outer periphery of the block plug (50) adheres closely to the opening end of the connecting portion (42) thereby defining the inside and outside of the pipe (40); wherein the pipe (40) is a refrigerant pipe for a refrigerating apparatus (10).

* * * * *